(12) United States Patent
Chapman et al.

(10) Patent No.: US 12,334,691 B2
(45) Date of Patent: Jun. 17, 2025

(54) SYSTEM FOR TRANSPORT AND DEPLOYMENT OF INTERNET OF BATTLEFIELD THINGS (IoBT) SENSORS

(71) Applicant: The United States of America, as Represented by the Secretary of the Navy, San Diego, CA (US)

(72) Inventors: Aaron Elizabeth Chapman, Charleston, SC (US); Ian McLean Christine, Charleston, SC (US); Wilmot Singleton Gilland, IV, Charleston, SC (US); Hunter Joseph Smith, Charleston, SC (US); Lucas Duane Powell, Charleston, SC (US); Peyton Cavaroc, Hollywood, SC (US); Kevin Paul Votapka, Charleston, SC (US); Laura Catherine Tolliver, Charleston, SC (US); Maxwell Thomas Dissington, Charleston, SC (US)

(73) Assignee: United States of America as represented by the Secretary of the Navy, Washington, DC (US)

(*) Notice: Subject to any disclaimer, the term of this patent is extended or adjusted under 35 U.S.C. 154(b) by 479 days.

(21) Appl. No.: 17/835,192

(22) Filed: Jun. 8, 2022

(65) Prior Publication Data
US 2023/0400903 A1 Dec. 14, 2023

(51) Int. Cl.
*H01R 25/14* (2006.01)
(52) U.S. Cl.
CPC .......... *H01R 25/14* (2013.01); *Y10T 29/5313* (2015.01)

(58) Field of Classification Search
CPC ...... H01R 25/14; H02J 7/0045; H02J 7/0013; Y10T 29/5313
USPC .......................... 29/729, 428, 730, 757, 832
See application file for complete search history.

(56) References Cited

U.S. PATENT DOCUMENTS 10,869,159 B1 * 12/2020 Nguyen ................ H04W 4/026
11,310,870 B2 * 4/2022 Radmand .............. H04W 84/18

* cited by examiner

*Primary Examiner* — Thiem D Phan
(74) *Attorney, Agent, or Firm* — Naval Information Warfare Center Pacific; Kyle Eppele

(57) ABSTRACT

A system transports and deploys of Internet of Battlefield Things (IoBT) sensors. A transportation rail has a first dovetail engagement accepting a respective second dovetail engagement of each IoBT sensor. A charging carrier has third dovetail engagements each accepting a respective fourth dovetail engagement of a battery. The charging carrier charges the batteries during transport. A respective fifth dovetail engagement of each IoBT sensor also accepts the respective fourth dovetail engagement of each battery. The battery powers the IoBT sensor during deployment. A method transports and deploys IoBT sensors. The IoBT sensors on the transportation rail are transported together with the batteries on the charging carrier, with the charging carrier charging the batteries. An IoBT sensor is dispensed from the transportation rail, and a battery is dispensed from the charging carrier. The IoBT sensor joined with the battery is deployed, with the battery powering the IoBT sensor during deployment.

17 Claims, 3 Drawing Sheets

SYSTEM FOR TRANSPORT AND DEPLOYMENT OF INTERNET OF BATTLEFIELD THINGS (IoBT) SENSORS

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 113087.

BACKGROUND OF THE INVENTION

Large numbers of Internet of Battlefield Things (IoBT) sensors are deployed. Because of this, a mechanism is needed for transporting the sensors in a lightweight, compact form factor. The transport mechanism should enable the warfighter to carry and quickly deploy IoBT sensors in a tactical environment. This allows for streamlined processes and minimizes command and control burden.

SUMMARY

A system for transport and deployment of Internet of Battlefield Things (IoBT) sensors includes a transportation rail and a charging carrier. The transportation rail has a first dovetail engagement or engagements extending along a major length of a major surface of the transportation rail. The first dovetail engagement accepts a respective second dovetail engagement of each of the IoBT sensors during the transport of the IoBT sensors. The charging carrier has third dovetail engagements each accepting a respective fourth dovetail engagement of any one of the batteries during the transport. The charging carrier charges the batteries during the transport. A respective fifth dovetail engagement of each one of the IoBT sensors also accepts the respective fourth dovetail engagement of any one of the batteries. The battery powers the IoBT sensor during the deployment of the IoBT sensor.

A method transports and deploys Internet of Battlefield Things (IoBT) sensors. A respective dovetail engagement of each of the IoBT sensors is accepted into a dovetail engagement or engagements extending along a major length of a major surface of a transportation rail. A respective dovetail engagement of each of the batteries is accepted into dovetail engagements of a charging carrier. The IoBT sensors carried on the transportation rail are transported together with the batteries carried on the charging carrier, with the charging carrier charging the batteries during the transport. An IoBT sensor of the IoBT sensors is dispensed upon sliding the respective dovetail engagement of the IoBT sensor out of the dovetail engagement or engagement of the transportation rail. A battery of the batteries is dispensed upon sliding the respective dovetail engagement of the battery for the IoBT sensor out of one of the dovetail engagements of the charging carrier. Another respective dovetail engagement of the IoBT sensor is joined with the respective dovetail engagement of the battery. The IoBT sensor joined with the battery is deployed, with the battery powering the IoBT sensor during the deployment.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed systems and methods below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Existing carrier platforms have a rigid or malleable enclosure with the drawbacks of being bulky and denying the operator access to the sensor unless it is removed from the carrier. Embodiments of the invention do not require a box, pouch, or encasement, and this minimizes the amount of operator effort required for deployment. Furthermore, the minimalist design reduces weight, complexity, and points of failure with modular components that can be 3D printed in the field that are assembled together with mechanical parts readily found in the field.

Figure 1A:
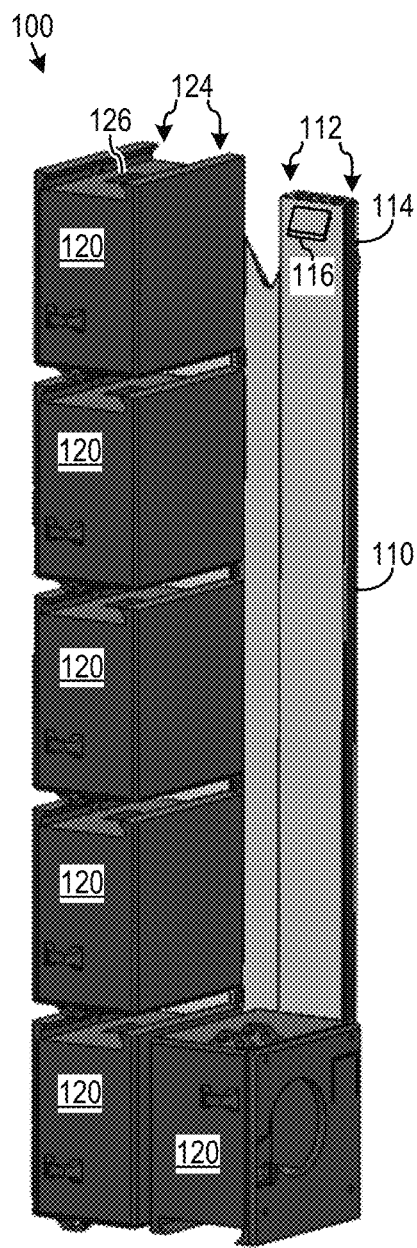
FIG. 1A-B are perspective views of a transportation rail for accepting Internet of Battlefield Things (IoBT) sensors in a system for transport and deployment of the IoBT sensors in accordance with an embodiment of the invention.
Figure 1B:
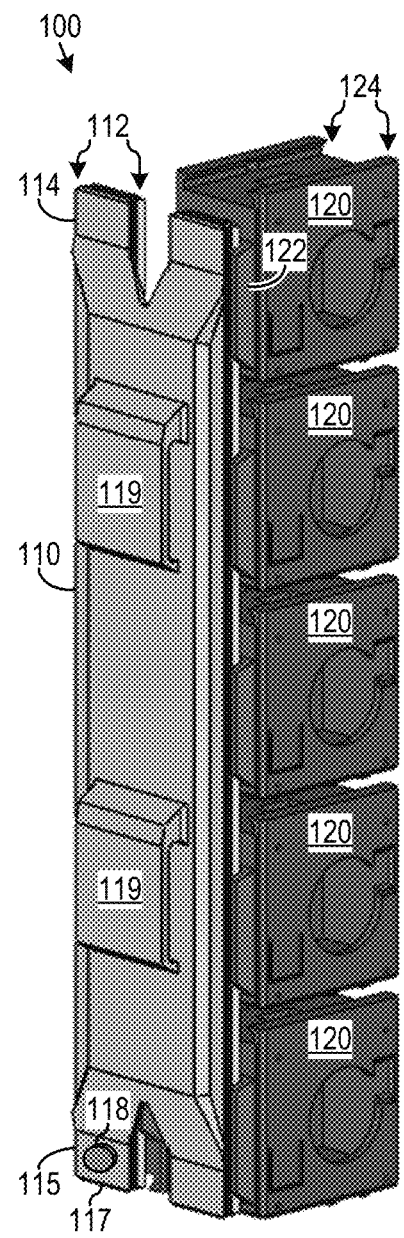
Figure 2A:
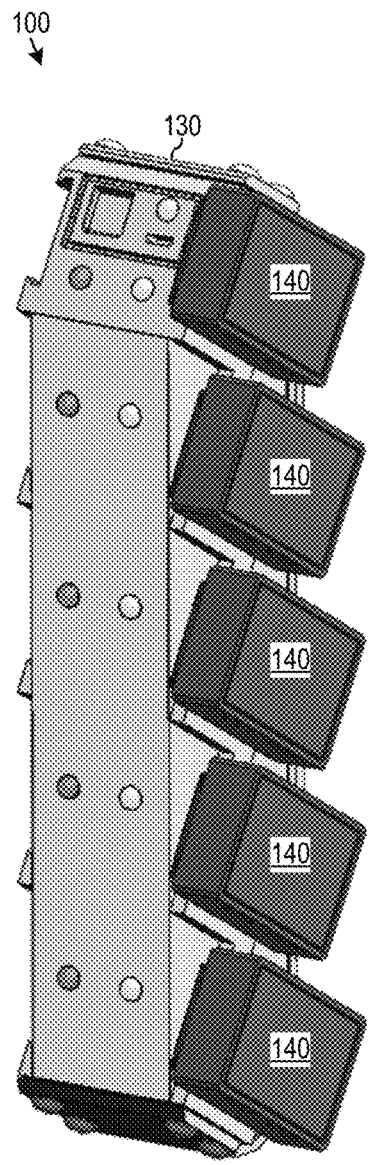
FIG. 2A-C are perspective views of a charging carrier for charging batteries for powering the IoBT sensors in a system for transport and deployment of the IoBT sensors in accordance with an embodiment of the invention.
Figure 2B:
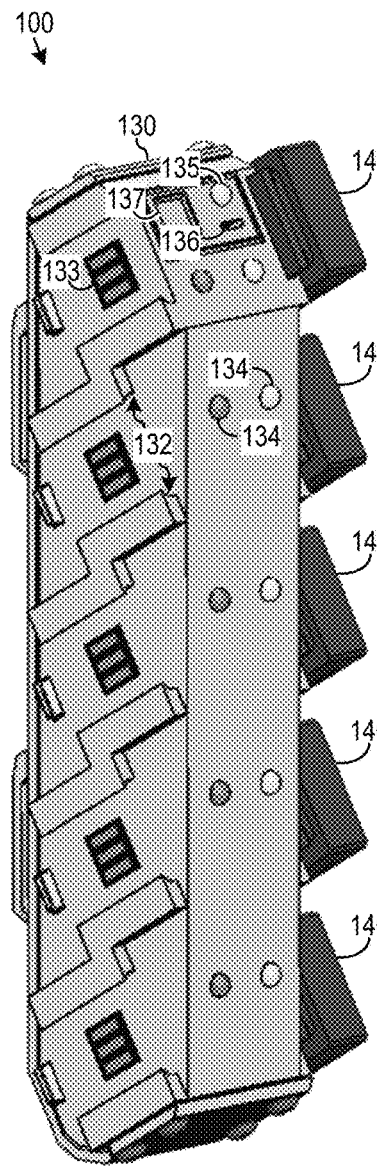
Figure 2C:
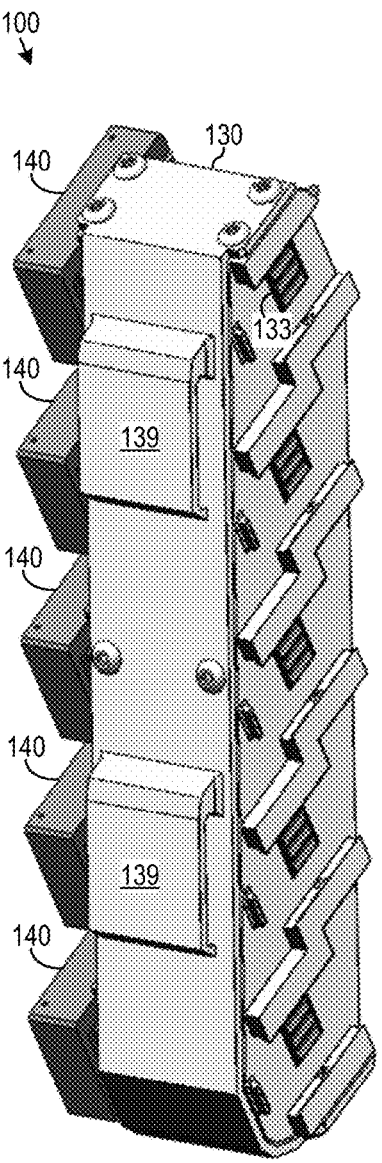

A system 100 for transport and deployment of Internet of Battlefield Things (IoBT) sensors 120 includes a transportation rail 110 of FIG. 1A-B and a charging carrier 130 of FIG. 2A-C. In one embodiment, system 100 also includes the IoBT sensors 120 and the batteries 140.

FIG. 1A-B are perspective views of a transportation rail 110 for accepting Internet of Battlefield Things (IoBT) sensors 120 in a system 100 for transport and deployment of the IoBT sensors 120 in accordance with an embodiment of the invention. The transportation rail 110 has a first dovetail engagement 112 or engagements extending along a major length of a major surface of the transportation rail 110. The first dovetail engagement 112 accepts a respective second dovetail engagement 122 of each of the IoBT sensors 120 during the transport of the IoBT sensors 120.

In an embodiment not shown, the first dovetail engagement 112 of the transportation rail 110 is a single dovetail engagement for accepting the respective second dovetail engagement 122 of all of the IoBT sensors 120 during the transport of the IoBT sensors 120. In the embodiment of FIG. 1A-B, the first dovetail engagement 112 of the transportation rail 110 is two dovetail engagements for together accepting the respective second dovetail engagement 122 of all of the IoBT sensors 120 during the transport of the IoBT sensors 120. As defined in the specification and claims, a dovetail engagement is any mechanical arrangement that permits only one-dimensional relative movement between the dovetail engagement and a matching dovetail engagement. Examples of a dovetail engagement include each side of a dovetail joint, drawer slides, or straight or curved train tracks.

The first dovetail engagement 112 of the transportation rail 110 is asymmetrically polarized for accepting the respective second dovetail engagement 122 of each of the IoBT sensors 120 in a unique orientation. As shown in FIG. 1A, the asymmetrical polarization is reversed between the left dovetail engagement and the right dovetail engagement 112 of the transportation rail 110, such that these first dovetail engagements accept the IoBT sensors 120 in opposite orientations.

The transportation rail 110 extends along the major length from a first end 114 to a second end 115 of the transportation rail 110. For transport, the first dovetail engagement 112 of the transportation rail 110 is for accepting each of the IoBT sensors 120 upon sliding the respective second engagement 122 of the IoBT sensor into the first dovetail engagement 112 at the first end 114 of the transportation rail 110. For deployment, the first dovetail engagement 112 of the transportation rail 110 is for dispensing each IoBT sensor upon sliding the respective second dovetail engagement 122 of the IoBT sensor out of the first dovetail engagement 112 at the second end 115 of the transportation rail 110.

In one embodiment, the transportation rail 110 includes a one-way spring gate 116 for accepting each one of the IoBT sensors 120 at the first end 114 of the transportation rail 110, and afterwards for preventing removal of the IoBT sensor from the first end 114 of the transportation rail 110. The transportation rail 110 also includes a one-way detent 117 for preventing removal of each of the IoBT sensors 120 from the second end 115 of the transportation rail 110 until a pulling force applied to the IoBT sensor exceeds a threshold force, and then permitting removal of the IoBT sensor from the second end 115 of the transportation rail 110. For example, the one-way detent 117 is a rubber stop that deforms under the threshold pulling force to allow removal of the IoBT sensor. Alternatively, the transportation rail 110 includes a releasing control 118 disposed toward the second end 115 of the transportation rail 110 and the transportation rail 110 further includes a one way detent 117 for preventing removal of each of the IoBT sensors 120 from the second end 115 of the transportation rail 110 until the releasing control 118 is activated, and then permitting removal of the IoBT sensor from the second end 115 of the transportation rail 110.

FIG. 2A-C are perspective views of a charging carrier 130 for charging batteries 140 for powering the IoBT sensors 120 in a system 100 for transport and deployment of the IoBT sensors 120 in accordance with an embodiment of the invention.

The charging carrier 130 has third dovetail engagements 132 each accepting a respective fourth dovetail engagement (not shown) of any one of the batteries 140 during transport. The charging carrier 130 charges the batteries 140 during the transport. A respective fifth dovetail engagement 124 (see FIG. 1A-B) of each of the IoBT sensors 120 also accepts the respective fourth dovetail engagement (not shown) of any one of the batteries 140, with the battery powering the IoBT sensor during the deployment of the IoBT sensor.

The first dovetail engagement 112 of the transportation rail 110 is keyed for accepting the respective second dovetail engagement 122 of each of the IoBT sensors 120, but not for accepting each of the third dovetail engagements 132 of the charging carrier 130, not for accepting the respective fourth dovetail engagement (not shown) of each of the batteries 140, and not for accepting the respective fifth dovetail engagement 124 of each of the IoBT sensors 120. The respective second dovetail engagement 122 of each of the IoBT sensors 120 is keyed not for accepting each of the third dovetail engagements 132 of the charging carrier 130, not for accepting the respective fourth dovetail engagement (not shown) of each of the batteries 140, and not for accepting the respective fifth dovetail engagement 124 of each of the IoBT sensors 120. The third dovetail engagements 132 of the charging carrier 130 are each keyed for accepting the respective fourth dovetail engagement (not shown) of each of the batteries 140, but not for accepting the respective fifth dovetail engagement 124 of each of the IoBT sensors 120. The respective fifth dovetail engagement 124 of each of the IoBT sensors 120 is keyed for accepting the respective fourth dovetail engagement (not shown) of each of the batteries 140.

Each of the third dovetail engagements 132 of the charging carrier 130 and the respective fifth dovetail engagement 124 of each of the IoBT sensors 120 are asymmetrically polarized for accepting the respective fourth dovetail engagement (not shown) of each of the batteries 140 in a unique orientation.

For transport, each of the third dovetail engagements 132 of the charging carrier 130 accepts each of the batteries 140 upon sliding the respective fourth dovetail engagement (not shown) of the battery into the third dovetail engagement of the charging carrier 130. For deployment, each of the third dovetail engagements 132 of the charging carrier 130 dispenses each of the batteries 140 upon sliding the respective fourth dovetail engagement (not shown) of the battery out of the third dovetail engagement of the charging carrier 130.

The respective fourth dovetail engagement (not shown) of each of the batteries 140 includes a first set of sliding electrical contacts (not shown), and each of the third dovetail engagements 132 of the charging carrier 130 includes a second set of sliding electrical contacts 133. The second set of sliding electrical contacts 133 is arranged in contact with the first set of sliding electrical contacts (not shown) of the battery for charging the battery from the charging carrier 130 during transport. Similarly, the respective fifth dovetail engagement 124 of each of the IoBT sensors 120 includes a third set of sliding electrical contacts 126. The third set of sliding electrical contacts 126 is arranged in contact with the first set of sliding electrical contacts (not shown) of the battery for powering the IoBT sensor from the battery during the deployment of the IoBT sensor.

The charging carrier 130 includes an internal main battery (not shown) and status indicators 134 and 135. The main battery is charged through a charging port, such as USB charging port 136. The main battery charges the batteries 140 carried on the charging carrier 130 during transport. Each of the indicators 134 indicates whether a respective one of the batteries 140 carried on the charging carrier 130 is fully charged during the transport. For example, each of the indicators 134 is green when the respective battery is fully charged, yellow when the respective battery is currently charging from the main battery, and unlit or red when no battery is engaged at a corresponding one of the third dovetail engagements 132. Similarly, indicator 135 indicates a status of the internal main battery, for example, green for fully charged, yellow for 75% charged, orange for 50% charged, red for 25% charged, and unlit when 0% charged. A momentary or latching pushbutton 137 enables the indicators 134 and 135 in one embodiment.

As shown in FIG. 1B, the transportation rail 110 has opposite the major surface another major surface, which has a first clip arrangement 119 for attaching the transportation rail 110 to a transporter during the transport of the IoBT sensors 120 carried on the transportation rail 110. Similarly as shown in FIG. 2C, the charging carrier 130 has a second clip arrangement 139 for attaching the charging carrier 130 to the transporter during the transport of the IoBT sensors 120 carried on the transportation rail 110 together with the batteries 140 carried on the charging carrier 130. For example, the transporter is a standard tactical backpack worn on a warfighter.

In one embodiment during transport, the system 100 includes the IoBT sensors 120 carried on the transportation rail 110 with the first dovetail engagement 112 or engagements of the transportation rail 110 accepting the respective second dovetail engagement 122 of each of the IoBT sensors 120, and the batteries 140 carried on the charging carrier 130 with the third dovetail engagements 132 of the charging carrier 130 accepting the respective fourth dovetail engagement (not shown) of the batteries 140 for charging the batteries 140.

In one embodiment during deployment, the system 100 includes the IoBT sensors 120 removed from the transportation rail 110, and the batteries 140 removed from the charging carrier 130 with the respective fifth dovetail engagement 124 of each of the IoBT sensors 120 accepting the respective fourth dovetail engagement (not shown) of a corresponding one of the batteries 140 for powering the IoBT sensor.

Figure 3:
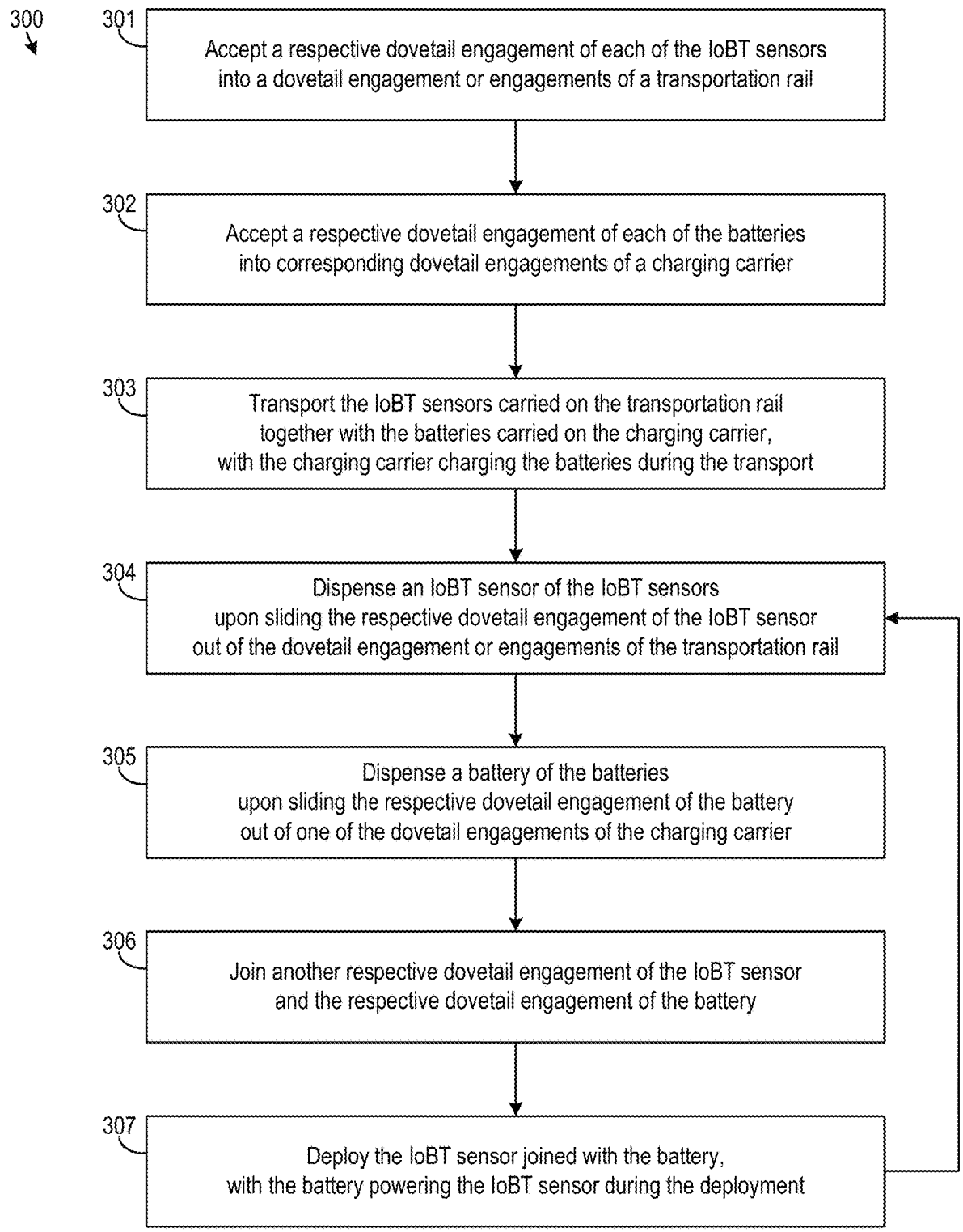
FIG. 3 is a flow diagram of a process for transport and deployment of the IoBT sensors and the batteries in accordance with an embodiment of the invention.

FIG. 3 is a flow diagram of a process 300 for transport and deployment of the IoBT sensors and the batteries in accordance with an embodiment of the invention.

At step 301, a respective dovetail engagement of each of the IoBT sensors is accepted into at least one dovetail engagement extending along a major length of a major surface of a transportation rail. At step 302, a respective dovetail engagement of each of the batteries is accepted into corresponding dovetail engagements of a charging carrier.

At step 303, the IoBT sensors carried on the transportation rail are transported together with the batteries carried on the charging carrier, with the charging carrier charging the batteries during the transport.

At step 304, an IoBT sensor of the IoBT sensors is dispensed upon sliding the respective dovetail engagement of the IoBT sensor out of the dovetail engagement or engagements of the transportation rail. At step 305, a battery of the batteries is dispensed upon sliding the respective dovetail engagement of the battery for the IoBT sensor out of one of the dovetail engagements of the charging carrier.

In one embodiment, step 301 includes accepting the IoBT sensor through a one-way spring gate at a first end of the transportation rail, the one-way spring gate subsequently preventing removal of the IoBT sensor from the first end of the transportation rail, and step 304 includes dispensing the IoBT sensor from the transportation rail through a one-way detent for preventing removal of the IoBT sensor from a second end of the transportation rail until a pulling force applied to IoBT sensor exceeds a threshold force and/or for preventing removal of the IoBT sensor from the second end of the transportation rail until a releasing control disposed toward the second end is activated, and then permitting removal of the IoBT sensor from the second end of the transportation rail.

At step 306, joined are another respective dovetail engagement of the IoBT sensor and the respective dovetail engagement of the battery. At step 307, the IoBT sensor joined with the battery is deployed, with the battery powering the IoBT sensor during the deployment.

In one embodiment, process 300 proceeds from step 307 back to step 304 to repeat, for each IoBT sensor of the IoBT sensors, the dispensing the IoBT sensor at step 304, the dispensing of the battery for the IoBT sensor at step 305, the joining of the IoBT sensor and the battery at step 306, and the deploying of the IoBT sensor joined with the battery at step 307.

From the above description of System and Method for Transport and Deployment of Internet of Battlefield Things (IoBT) Sensors, it is manifest that various techniques may be used for implementing the concepts of the system 100 and the method 300 without departing from the scope of the claims. The described embodiments are to be considered in all respects as illustrative and not restrictive. The system 100 and the method 300 disclosed herein may be practiced in the absence of any element that is not specifically claimed and/or disclosed herein. It should also be understood that system 100 or method 300 is not limited to the particular embodiments described herein, but is capable of many embodiments without departing from the scope of the claims.

We claim:

1. A system for transport and deployment of a plurality of Internet of Battlefield Things (IoBT) sensors comprising:
    a transportation rail having at least one first dovetail engagement extending along a major length of a major surface of the transportation rail, said at least one first dovetail engagement for accepting a respective second dovetail engagement of each of the IoBT sensors during the transport of the IoBT sensors; and
    a charging carrier having a plurality of third dovetail engagements each for accepting a respective fourth dovetail engagement of any one of a plurality of batteries during the transport, the charging carrier for charging the batteries during the transport, a respective fifth dovetail engagement of each one of the IoBT sensors also for accepting the respective fourth dovetail engagement of any one of the batteries, the one of the batteries for powering the one of the IoBT sensors during the deployment of the one of the IoBT sensors.

2. The system of claim 1, wherein said at least one first dovetail engagement of the transportation rail is a single dovetail engagement for accepting the respective second dovetail engagement of all of the IoBT sensors during the transport of the IoBT sensors.

3. The system of claim 2, wherein:
    the transportation rail extends along the major length from a first end to a second end of the transportation rail;
    for the transport, said at least one first dovetail engagement of the transportation rail is for accepting each IoBT sensor of the IoBT sensors upon sliding the respective second dovetail engagement of the IoBT sensor into the first dovetail engagement at the first end of the transportation rail; and
    for the deployment, said at least one first dovetail engagement of the transportation rail is for dispensing the IoBT sensor upon sliding the respective second dovetail engagement of the IoBT sensor out of the first dovetail engagement at the second end of the transportation rail.

4. The system of claim 3, wherein the transportation rail includes a one-way spring gate for accepting each one of the IoBT sensors at the first end of the transportation rail, and afterwards for preventing removal of the one from the first end of the transportation rail.

5. The system of claim 3, wherein the transportation rail includes a one-way detent for preventing removal of each one of the IoBT sensors from the second end of the transportation rail until a pulling force applied to the one exceeds a threshold force, and then permitting removal of the one from the second end of the transportation rail.

6. The system of claim 3, wherein the transportation rail includes a releasing control disposed toward the second end of the transportation rail and the transportation rail further includes a one-way detent for preventing removal of each one of the IoBT sensors from the second end of the transportation rail until the releasing control is activated, and then permitting removal of the one from the second end of the transportation rail.

7. The system of claim 3, wherein:
for the transport, each third dovetail engagement of the third dovetail engagements of the charging carrier is for accepting each battery of the batteries upon sliding the respective fourth dovetail engagement of the battery into the third dovetail engagement of the charging carrier; and
for the deployment, each third dovetail engagement of the third dovetail engagements of the charging carrier is for dispensing each battery of the batteries upon sliding the respective fourth dovetail engagement of the battery out of the third dovetail engagement of the charging carrier.

8. The system of claim 7, wherein:
the respective fourth dovetail engagement of each battery of the batteries includes a first set of sliding electrical contacts;
each third dovetail engagement of the third dovetail engagements of the charging carrier includes a second set of sliding electrical contacts, wherein the second set arranged in contact with the first set of the battery is for charging the battery from the charging carrier; and
the respective fifth dovetail engagement of each IoBT sensor of the IoBT sensors includes a third set of sliding electrical contacts, wherein the third set arranged in contact with the first set of the battery is for powering the IoBT sensor from the battery during the deployment of the IoBT sensor.

9. The system of claim 2, wherein:
for the transport, each third dovetail engagement of the third dovetail engagements of the charging carrier is for accepting each battery of the batteries upon sliding the respective fourth dovetail engagement of the battery into the third dovetail engagement of the charging carrier; and
for the deployment, each third dovetail engagement of the third dovetail engagements of the charging carrier is for dispensing each battery of the batteries upon sliding the respective fourth dovetail engagement of the battery out of the third dovetail engagement of the charging carrier.

10. The system of claim 2, wherein the charging carrier includes a main battery and a plurality of indicators, the main battery for charging the batteries carried on the charging carrier during the transport and each of the indicators for indicating whether a respective one of the batteries carried on the charging carrier is fully charged during the transport.

11. The system of claim 2, wherein:
the transportation rail has opposite the major surface another major surface, which has a first clip arrangement for attaching the transportation rail to a transporter during the transport of the IoBT sensors carried on the transportation rail; and the charging carrier has a second clip arrangement for attaching the charging carrier to the transporter during the transport of the IoBT sensors carried on the transportation rail together with the batteries carried on the charging carrier.

12. The system of claim 2 further comprising:
the IoBT sensors; and
the batteries.

13. The system of claim 2 during the transport, the system further comprising:
the IoBT sensors carried on the transportation rail with said at least one first dovetail engagement of the transportation rail accepting the respective second dovetail engagement of each of the IoBT sensors; and
the batteries carried on the charging carrier with the third dovetail engagements of the charging carrier accepting the respective fourth dovetail engagement of the batteries for charging the batteries.

14. The system of claim 2 during the deployment, the system further comprising:
the IoBT sensors removed from the transportation rail; and
the batteries removed from the charging carrier with the respective fifth dovetail engagement of each one of the IoBT sensors accepting the respective fourth dovetail engagement of a corresponding one of the batteries for powering the one of the IoBT sensors.

15. The system of claim 1, wherein said at least one first dovetail engagement of the transportation rail is two dovetail engagements for together accepting the respective second dovetail engagement of all of the IoBT sensors during the transport of the IoBT sensors.

16. The system of claim 1, wherein:
said at least one first dovetail engagement of the transportation rail is keyed for accepting the respective second dovetail engagement of each of the IoBT sensors, but not for accepting each of the third dovetail engagements of the charging carrier, not for accepting the respective fourth dovetail engagement of each of the batteries, and not for accepting the respective fifth dovetail engagement of each of the IoBT sensors;
the respective second dovetail engagement of each of the IoBT sensors is keyed not for accepting each of the third dovetail engagements of the charging carrier, not for accepting the respective fourth dovetail engagement of each of the batteries, and not for accepting the respective fifth dovetail engagement of each of the IoBT sensors;
the third dovetail engagements of the charging carrier are each keyed for accepting the respective fourth dovetail engagement of each of the batteries, but not for accepting the respective fifth dovetail engagement of each of the IoBT sensors; and
the respective fifth dovetail engagement of each of the IoBT sensors is keyed for accepting the respective fourth dovetail engagement of each of the batteries.

17. The system of claim 16, wherein:
said at least one first dovetail engagement of the transportation rail is asymmetrically polarized for accepting the respective second dovetail engagement of each of the IoBT sensors in a unique orientation; and
each of the third dovetail engagements of the charging carrier and the respective fifth dovetail engagement of each of the IoBT sensors are asymmetrically polarized for accepting the respective fourth dovetail engagement of each of the batteries in a unique orientation.

* * * * *